United States Patent
Alsayegh et al.

(10) Patent No.: US 12,435,289 B1
(45) Date of Patent: Oct. 7, 2025

(54) ALTERING SEDIMENTATION MECHANISMS IN CARBON-BASED NANO-LUBRICANTS

(71) Applicant: KUWAIT UNIVERSITY, Safat (KW)

(72) Inventors: Naser Alsayegh, Safat (KW); Ammar M. Bahman, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 19/184,530

(22) Filed: Apr. 21, 2025

(51) Int. Cl.
| | |
|---|---|
| *C10M 125/02* | (2006.01) |
| *C10M 107/32* | (2006.01) |
| *C10M 169/04* | (2006.01) |
| *C10N 20/00* | (2006.01) |
| *C10N 20/06* | (2006.01) |
| *C10N 50/00* | (2006.01) |

(52) U.S. Cl.
CPC ........ *C10M 125/02* (2013.01); *C10M 107/32* (2013.01); *C10M 169/04* (2013.01); *C10N 2020/06* (2013.01); *C10N 2020/063* (2020.05); *C10N 2050/015* (2020.05)

(58) Field of Classification Search
CPC .............. C10M 125/02; C10M 107/32; C10M 169/04; C10N 2020/06; C10N 2020/063; C10N 2050/015
USPC ......................................................... 508/113
See application file for complete search history.

(56) References Cited

U.S. PATENT DOCUMENTS

| | | |
|---|---|---|
| 6,695,974 B2 | 2/2004 | Withers et al. |
| 6,783,746 B1 | 8/2004 | Zhang et al. |
| 7,348,298 B2 | 3/2008 | Zhang et al. |
| 7,871,533 B1 | 1/2011 | Haiping et al. |
| 8,075,799 B2 | 12/2011 | Hong et al. |
| 9,892,835 B2 | 2/2018 | Hong et al. |
| 10,266,784 B2 | 4/2019 | Ramon Raygoza et al. |
| 2011/0003721 A1* | 1/2011 | Hong .................... C10M 169/04 977/750 |

FOREIGN PATENT DOCUMENTS

WO    WO-03106600 A1 * 12/2003  .......... C10M 171/06

OTHER PUBLICATIONS

Nugroho, A., et al., "Extensive examination of sonication duration impact on stability of Al2O3-Polyol ester nanolubricant," International Communications in Heat and Mass Transfer 126 (2021): 105418 (abstract).

(Continued)

*Primary Examiner* — Prem C Singh
*Assistant Examiner* — Francis C Campanell
(74) *Attorney, Agent, or Firm* — Nath, Goldberg & Meyer; Joshua B. Goldberg (57) ABSTRACT

Methods of making improved nanolubricants are providing including dispersing carbon nanoparticles selected from the group consisting of graphene (GN), single-walled carbon nanotubes (SWCNTs), and multi-walled carbon nanotubes (MWCNTs) in a base fluid, such as POE. The carbon nanoparticles are dispersed by adding the carbon nanoparticles to the base fluid to obtain a mixture and mixing the mixture for about 5 minutes using a magnetic stirrer to obtain a suspension. The resulting suspension is then further dispersed using a bath ultrasonicator for about 60 minutes starting at about 25° C. The temperature may be varied up to about 49° C. and back down to about 25° C. over the course of the 60-minute period.

16 Claims, 9 Drawing Sheets

(56) References Cited

OTHER PUBLICATIONS

Marquis, F. D. S., and Chibante, L. P. F., "Improving the heat transfer of nanofluids and nanolubricants with carbon nanotubes." JOM 57 (2005): 32-43.

Raghavulu, K. Veera, et al., "Optimization and tribological behavior of carbon nano tubes blended with POE oil," Engineering Research Express 6, (2024): 035430.

Ali, N. et al., "Carbon-Based Nanofluids and Their Advances towards Heat Transfer Applications—A Review," Nanomaterials 11(6): 1628 (2021).

Ali, N. et al., "Aluminium Nanofluids Stability: A Comparison between the Conventional Two-Step Fabrication Approach and the Controlled Sonication Bath Temperature Method," J of Nanomaterials 3930572 (2019).

Kim, H. et al., "Nano-lubrication: A review," Int. J. Precision Eng. and Man. 17: pp. 829-841 (2016), (Abstract).

Yu, W. and Xie, H., "A Review on Nanofluids: Preparation, Stability Mechanisms, and Applications," J. of Nanomaterials, 1 (2012).

Azman, N. F. and Samion, S., "Dispersion Stability and Lubrication Mechanism of Nanolubricants: A Review," Int. J. of Prec. Eng. and Man. Green Tech. 6: pp. 393-414 (2019). (Abstract).

\* cited by examiner

ALTERING SEDIMENTATION MECHANISMS IN CARBON-BASED NANO-LUBRICANTS

FIELD AND BACKGROUND OF THE INVENTION

The disclosure of the present patent application relates to nano-lubricants, and particularly to methods of altering sedimentation mechanisms to prolong the utility of carbon-based nano-lubricants.

DESCRIPTION OF THE PRIOR ART

Nanofluids are engineered colloidal suspensions comprising nanoparticles dispersed within a non-dissolving, non-chemically reactive base fluid such as water, ethylene glycol, or an oil. The nanoparticles, typically less than 100 nanometers in size, can be composed of metals (e.g., gold, silver), metal oxides (e.g., alumina, silica), carbides, or carbon-based materials like graphene and carbon nanotubes. The first goal of incorporating nanoparticles into base fluids was to enhance the thermal properties of the fluid, notably its thermal conductivity and heat transfer capabilities. This is because these particles have many times higher thermal conductivity compared to other liquids. As such, a fabricated nanofluid suspension would have a thermal conductivity somewhere between the base fluid and the dispersed nanoparticles. Later advancements in nanofluids showed the capability of enhancing other liquid properties, such as heat capacity, solar absorption, and tribological properties.

Historically, the concept of dispersing nanoparticles in base fluids was presented in 1993 by Masuda et al. as a novel approach to improve heat transfer fluids. Later, the term 'Nanofluid' was introduced by Choi and Eastman in 1995, which marked the beginning of this scientific field. Traditional methods of enhancing thermal properties involved adding millimeter- or micrometer-sized particles to fluids, which often led to issues like clogging, increased pressure drops, and sedimentation. The advent of nanotechnology allowed for the use of nanoparticles, which, due to their extremely small size and large surface area, provided significant improvements in thermal properties without the drawbacks associated with larger particles. In addition, nanofluids exhibit several enhanced thermophysical properties compared to their base fluids. For example, by dispersing nanoparticles in a base fluid, its thermal conductivity increases, thus facilitating more efficient heat transfer. Also, nanofluids can be engineered to have higher specific heat capacities, allowing them to absorb more heat energy per unit mass.

One of the commonly used categories of nanofluids is nano-lubricants, which are advanced lubricants that incorporate dispersed nanoparticles into base oils to enhance their thermal and tribological properties, such as reducing friction and wear. Common base oils include mineral oils, synthetic oils, and bio-lubricants. They have garnered significant attention due to their potential to improve lubrication performance in various mechanical systems, such as automotive engines, industrial machinery, metalworking, and air conditioning compressors.

Although nanofluids have proven to be beneficial to many real-life applications, their success depends on carefully selecting a nanomaterial with the required property as well as the level of dispersion stability. For instance, using carbon-based materials (e.g., graphene and carbon nanotubes (CNTs)) is favorable when it comes to nano-lubricants. This is because these materials have the highest known thermal transfer and lubrication properties. Hence, dispersing them in a base lubricant oil would significantly enhance its properties compared to their counterparts.

On the other hand, an unstable nano-lubricant would experience sedimentation of nanoparticles, leading to a decline in operational performance over time. Additionally, the specific mechanism of sedimentation plays a major role in determining how the degradation of the working fluid affects particular applications. Generally, there are three known sedimentation mechanisms, including dispersed sedimentation, mixed sedimentation, and flocculated sedimentation. It should be noted that sediment formation is unavoidable when dealing with suspensions, especially when the nano-lubricant is stationary for extended periods of time. However, being able to alter the sedimentation mechanism would be advantageous, particularly for stationary applications, as it would ensure a lower degradation in the working fluid performance over operational time.

Thus, methods of altering sedimentation mechanisms in carbon-based nano-lubricants solving the aforementioned problems are desired.

SUMMARY OF THE INVENTION

The methods disclosed herein include dispersing carbon nanoparticles selected from the group consisting of graphene (GN), single-walled carbon nanotubes (SWCNTs), and multi-walled carbon nanotubes (MWCNTs) in a base fluid. The carbon nanoparticles are dispersed by adding the carbon nanoparticles to the base fluid to obtain a mixture and mixing the mixture for about 5 minutes using a magnetic stirrer to obtain a suspension. The resulting suspension is then further dispersed using a bath ultrasonicator for about 60 minutes at a controlled temperature.

In an embodiment, the base fluid may be POE oil of type SL32.

In a preferred embodiment, the carbon nanoparticles may be MWCNTs and the method may comprise dispersing the MWCNTs by adding the MWCNTs to the base fluid to obtain a mixture and mixing the mixture for about 5 minutes using a magnetic stirrer to obtain a suspension. The resulting suspension is then further dispersed using a bath ultrasonicator for about 60 minutes while varying the water bath temperature. Varying the bath ultrasonicator's water bath temperature may comprise a starting temperature of about 25° C., increasing the water bath temperature at a rate of about 1° C. per 1.25 min until it reaches about 49° C., and then decreasing the water bath temperature at a rate of about 1° C. per 1.25 min until it returns to about 25° C. This method may result in a nanolubricant that has been shifted from demonstrating dispersed sedimentation to demonstrating flocculated sedimentation, thereby increasing the lifespan of the nanolubricant.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 1:
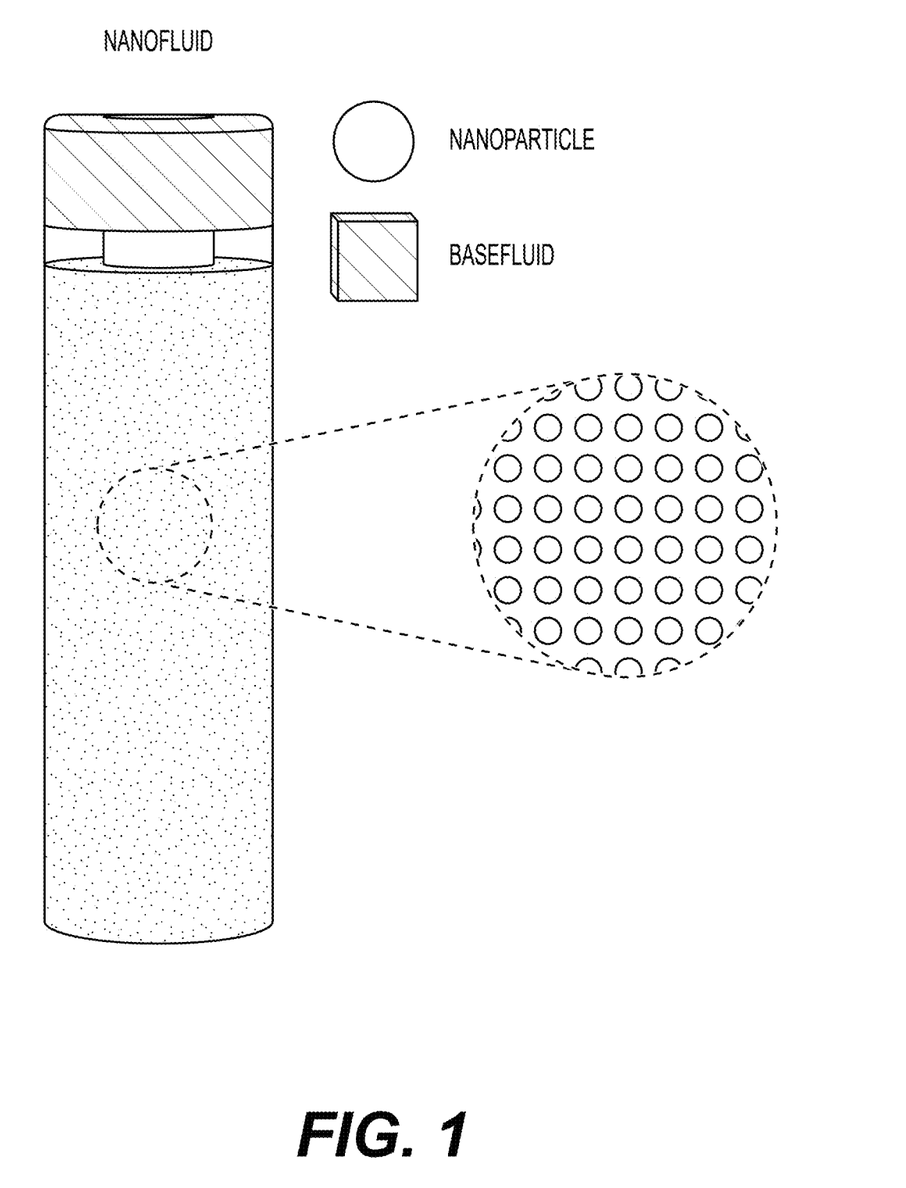
FIG. 1 is an illustration of a nanofluid including nanoparticles dispersed in a base fluid.

As used herein, a Nanofluid is a composition comprising nanoparticles dispersed in a base fluid. (See FIG. 1)

Figure 4A:
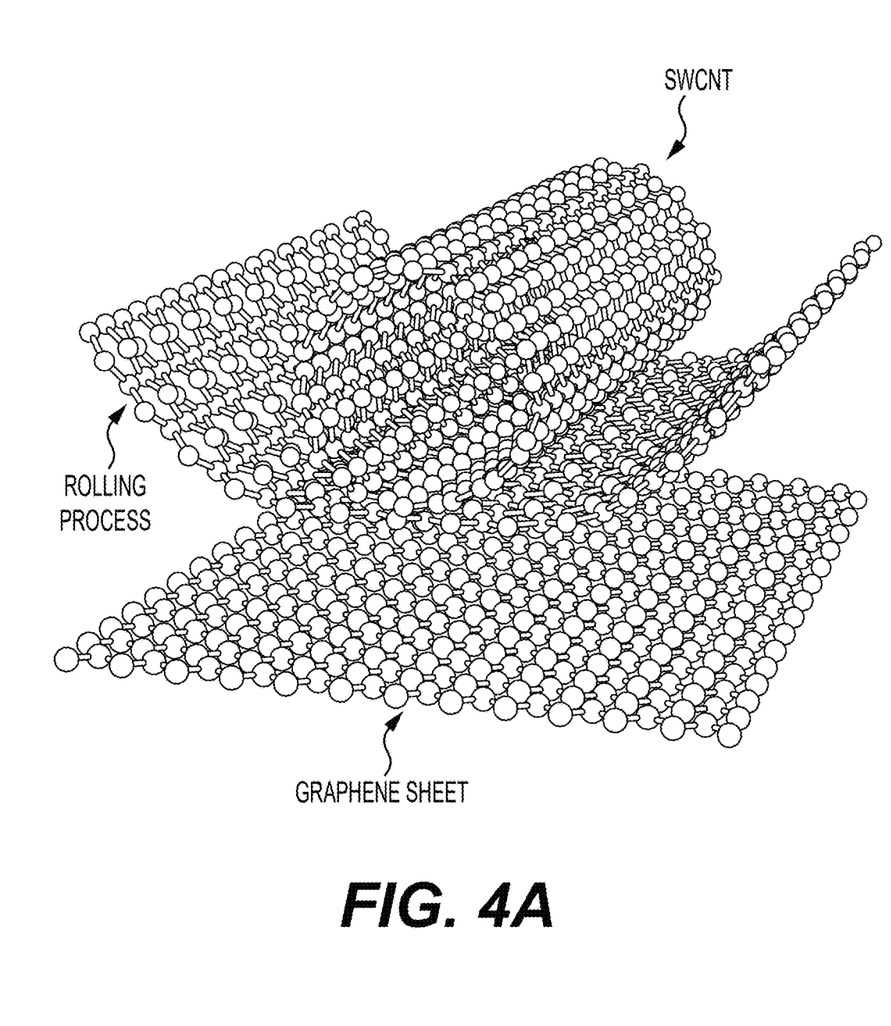
FIG. 4A is an illustration of a graphene sheet and the formation of a single walled carbon nanotube by rolling a graphene sheet.

As used herein, Graphene (GN) originates from bulk graphite with the shape of a 2D (i.e., monolayer) sheet of one-atom thickness and lattice of hexagonally arranged sp2 bonded carbon atoms. (See FIG. 4A)

Figure 4B:
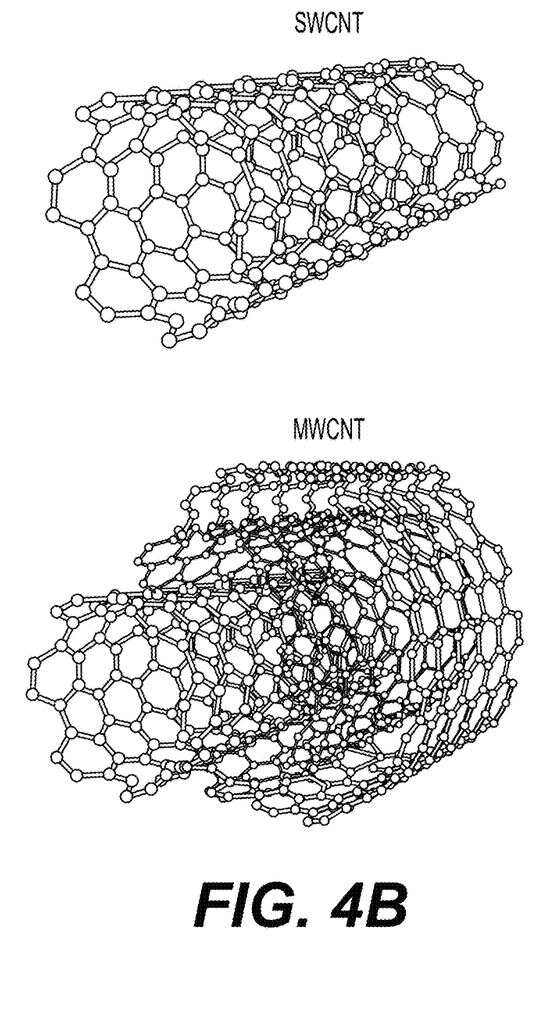
FIG. 4B is an illustration of a single walled carbon nanotube and a multiwalled carbon nanotube.
Figure 5A:
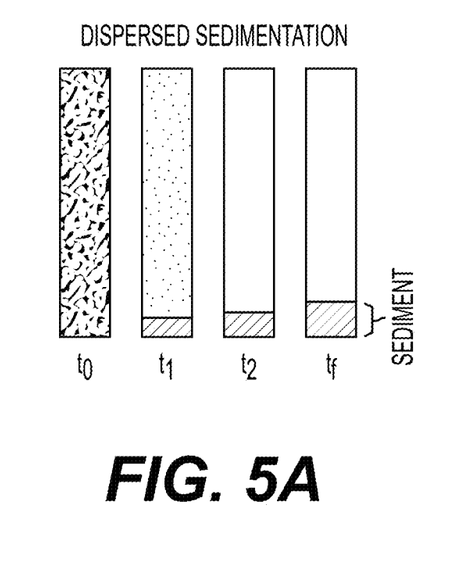
FIGS. 5A-5C depict sedimentation mechanisms of nanofluids, including (FIG. 5A) dispersed sedimentation, (FIG. 5B) mixed sedimentation, and (FIG. 5C) flocculated sedimentation.
Figure 5B:
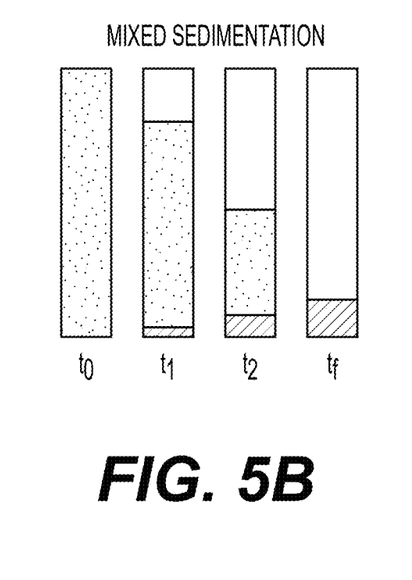
Figure 5C:
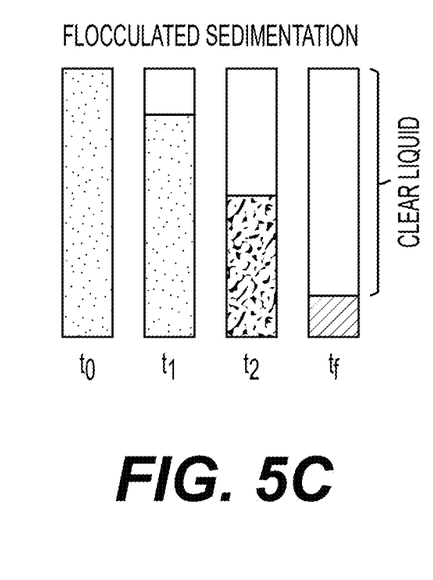
Figure 6A:
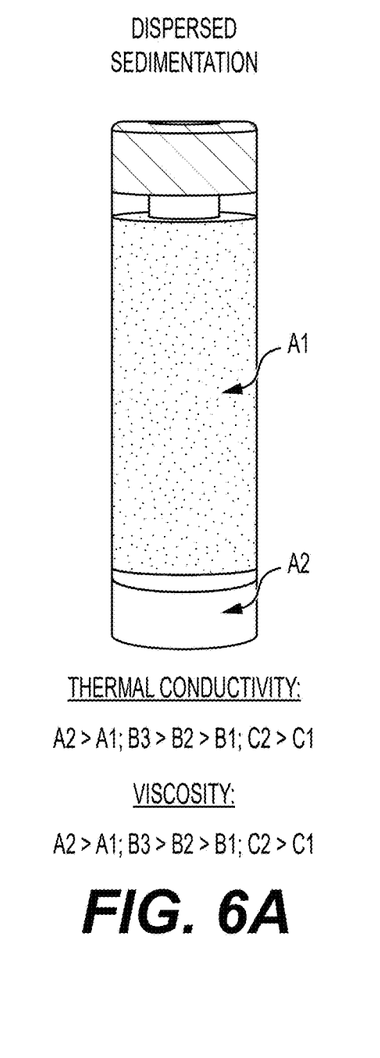
FIGS. 6A-6C compare the three different sedimentation mechanisms in terms of thermophysical properties, including (FIG. 6A) dispersed sedimentation, (FIG. 6B) mixed sedimentation, and (FIG. 6C) flocculated sedimentation.
Figure 6B:
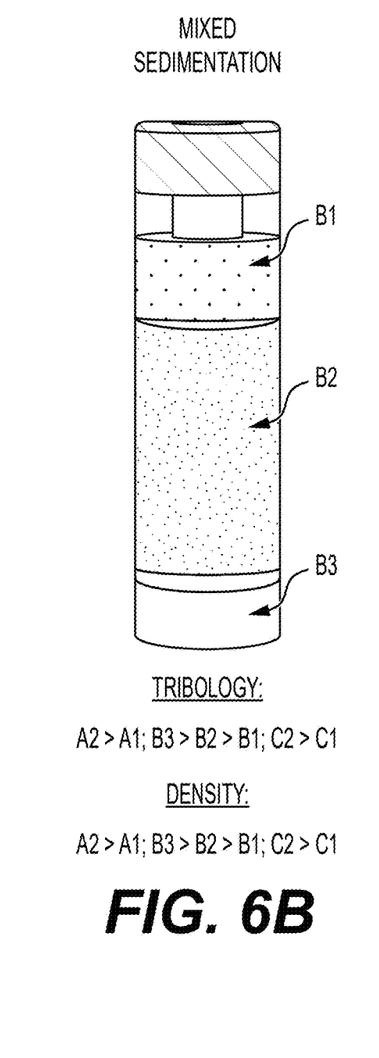
Figure 6C:
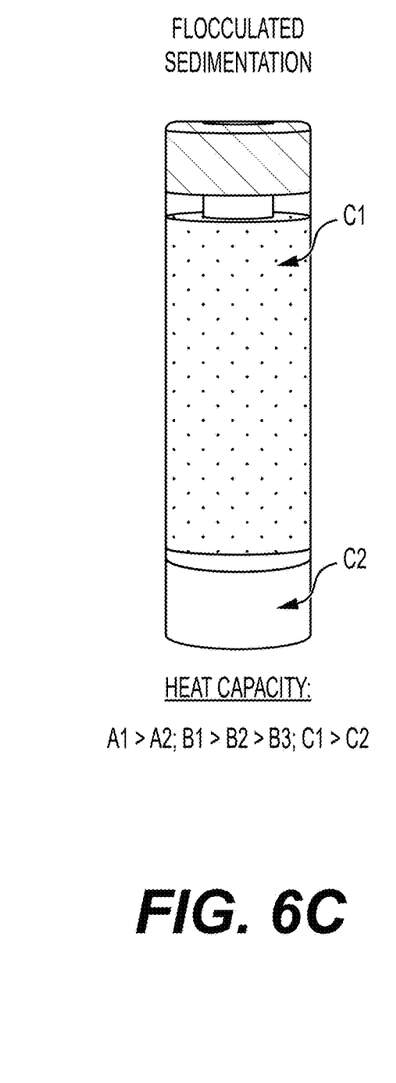
Figure 7A:
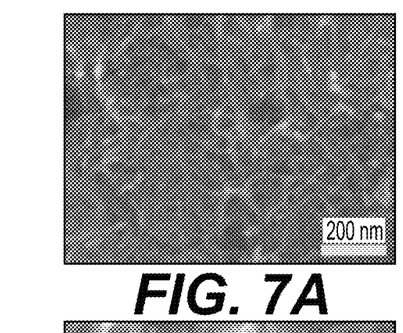
FIGS. 7A-7I depict FE-SEM and EDS analysis for short-SWCNTS (FIGS. 7A-7C), short-MWCNTs (FIGS. 7D-7F), and nanopowders (FIGS. 7G-7I).
Figure 7B:
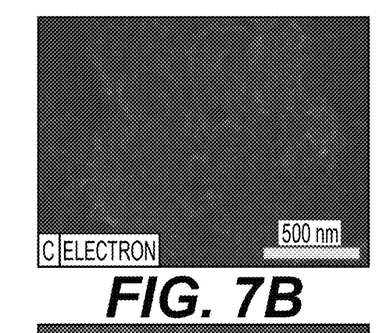
Figure 7C:
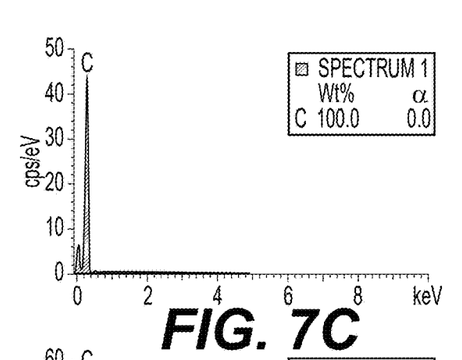
Figure 7D:
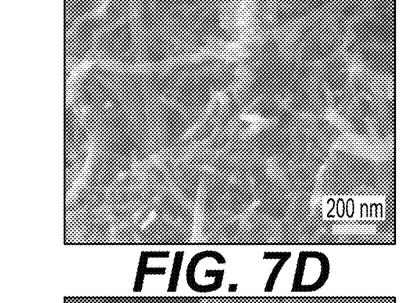
Figure 7E:
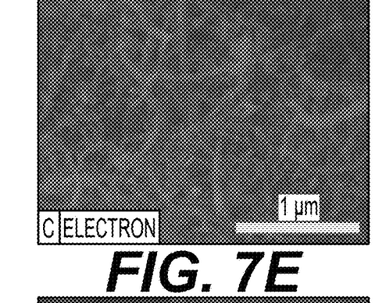
Figure 7F:
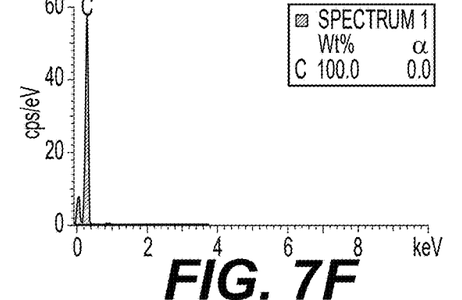
Figure 7G:
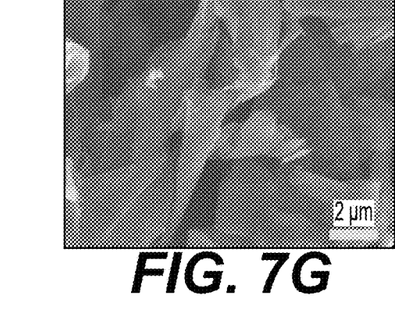
Figure 7H:
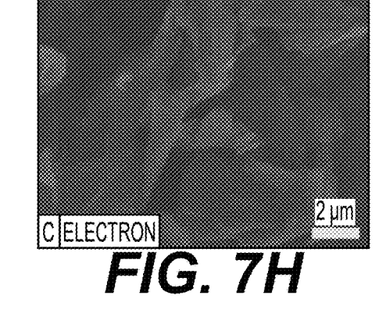
Figure 7I:
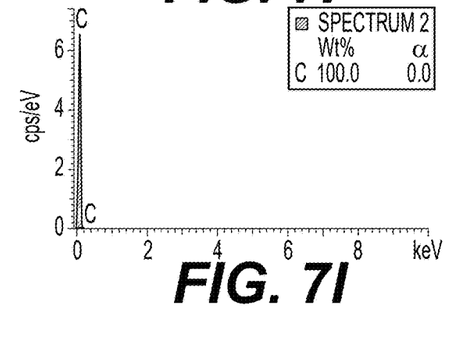

As used herein, Single-walled CNT (SWCNT) refers to a single graphene sheet rolled into a cylindrical tube. (See FIGS. 4A & 4B)

As used herein, a Multi-walled CNT (MWCNT) is made from rolling multiple sheets of graphene into cylindrical tubes, where the smaller tubes are nested within the larger tube. MWCNTs can also be made by embedding multiple SWCNTs of different diameters and lengths into each other. (See FIGS. 4A & 4B)

The present subject matter introduces a method for altering sedimentation mechanisms in carbon-based nano-lubricants, significantly enhancing their long-term stability and operational efficiency in thermal systems. Nano-lubricants, engineered by dispersing graphene (GN), single-walled carbon nanotubes (SWCNTs), and multi-walled carbon nanotubes (MWCNTs) in a base lubricant (including but not limited to Poly Olester Oil (POE) SL32), are tailored to transition sedimentation from dispersed to flocculated mechanisms. This transition minimizes performance degradation and optimizes thermal and tribological properties over extended durations.

The methods disclosed herein include dispersing carbon nanoparticles selected from the group consisting of graphene (GN), single-walled carbon nanotubes (SWCNTs), and multi-walled carbon nanotubes (MWCNTs) in a base fluid. The carbon nanoparticles are dispersed by adding the carbon nanoparticles to the base fluid to obtain a mixture and mixing the mixture for about 5 minutes using a magnetic stirrer to obtain a suspension. The resulting suspension is then further dispersed using a bath ultrasonicator for about 60 minutes at a controlled temperature.

In an embodiment, the base fluid may be POE oil of type SL32.

In an embodiment, the controlled temperature of the bath ultrasonicator water bath may be maintained at 25° C.

In an embodiment, the carbon nanoparticles may comprise graphene sheets. In a further embodiment, the graphene sheets may have a length, width, and thickness of about 0.5-2 µm, about 2-7 µm, and about 2-6 nm, respectively.

In an embodiment, the carbon nanoparticles may comprise SWCNT. In a further embodiment, the SWCNTs may have a length and a diameter of about 0.5-2 µm and about 1-2 nm, respectively.

In an embodiment, the carbon nanoparticles may comprise MWCNT. In a further embodiment, the MWCNTs may have a length and a diameter of about 0.5-2 µm and about 30-50 nm, respectively.

In an embodiment, 0.01 vol. % of the powdered carbon nanoparticles may be dispersed in the base fluid at room temperature.

In a preferred embodiment, the carbon nanoparticles may be MWCNTs and the method may comprise dispersing the MWCNTs by adding the MWCNTs to the base fluid to obtain a mixture and mixing the mixture for about 5 minutes using a magnetic stirrer to obtain a suspension. The resulting suspension is then further dispersed using a bath ultrasonicator for about 60 minutes while varying the water bath temperature. Varying the water bath temperature may comprise a starting temperature of about 25° C. that is increased at a rate of about 1° C. per 1.25 min until it reached about 49° C., after which it was decreased at the same rate until it returned to about 25° C. This method may result in a nanolubricant that has been shifted from demonstrating dispersed sedimentation to demonstrating flocculated sedimentation, thereby increasing the lifespan of the nanolubricant.

In dispersed sedimentation, individual nanoparticles settle separately, which leads to rapid performance degradation. In flocculated sedimentation, nanoparticles aggregate into clusters before settling, which results in a slower decline in operational performance. (See FIGS. 5A-6C)

In an embodiment, the magnetic stirring is performed in the same container used for sonication, to avoid additional mixing that would be introduced from pouring the suspension in another container.

In an embodiment the bath sonicator can be replaced with a probe sonicator to reduce the mixing duration and would provide the same results given that the suspension temperature can be controlled and altered throughout the fabrication process.

Degraded nano-lubricants are usually replaced with new ones. The present methods assist in fully harvesting the suspensions' capabilities based on the targeted thermal system. This new method is more feasible than having to replace a degraded nano-lubricant with a new one. The present methods are environmentally friendly, as using the present methods will require replacement nano-lubricants less frequently than using prior methods.

Figure 2:
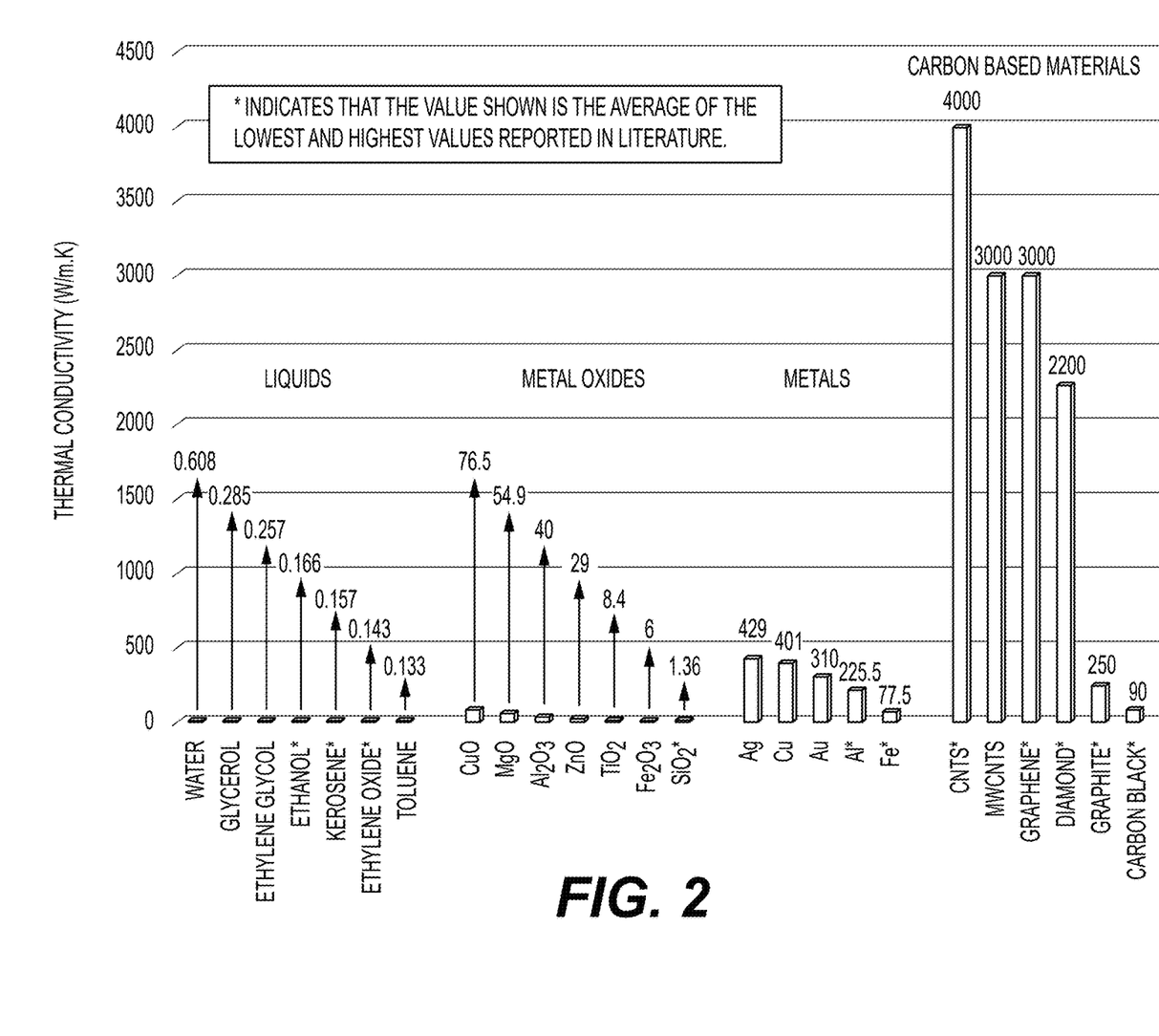
FIG. 2 is a graph illustrating the thermal conductivity of commonly used nanomaterials and base fluids.
Figure 3:
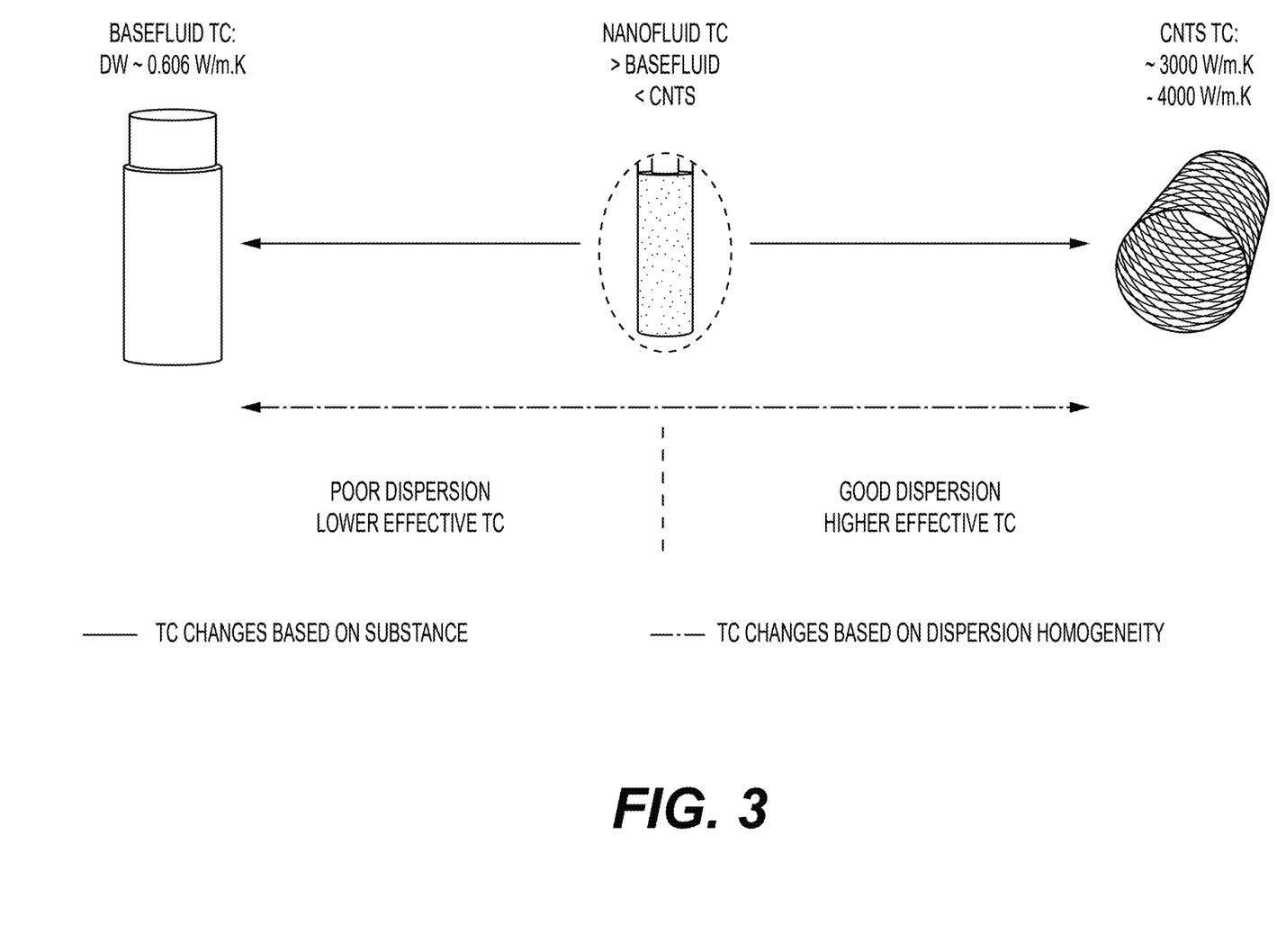
FIG. 3 depicts an example of the impact of nanofluid selection and base fluid selection on nanofluid thermal conductivity.

The methods disclosed herein leverage the exceptional thermal conductivity and lubrication properties of carbon-based nanomaterials, employing advanced dispersion techniques like magnetic stirring and ultrasonic mixing for precise nanoparticle incorporation. (See FIGS. 2-3) Experimental evaluations demonstrate that increasing GN sheets and rolling them into MWCNTs enhances sedimentation stability, as validated by a 45-day performance inspection. Potential applications include a broad range from air conditioning compressors to solar heating and industrial machinery. The present methods provide a sustainable and environmentally friendly alternative to conventional nano-lubricants. This pioneering approach addresses critical challenges in sedimentation stability and operational longevity, establishing a new benchmark in the field of nano-lubricants.

In an embodiment, nano-lubricants prepared according to the present methods may be useful in applications including air conditioning compressors, solar heating, lubricating gears, cutting lubricants, and the like.

The present subject matter may be better understood with reference to the following examples.

Example 1

Method of Improving Sedimentation in Carbon-Based Nanolubricants

The present subject matter introduces an innovative method to alter the sedimentation mechanism of carbon-based nano-lubricants. GN, short SWCNTs, and short MWCNTs were dispersed in POE oil of type SL32. The length, width, and thickness of the GN sheet used were about 0.5-2 µm, about 2-7 µm, and about 2-6 nm, respectively. The length and diameter of the CNTs used were about 0.5-2 µm×about 1-2 nm (SWCNT) and about 0.5-2 µm×about 30-50 nm (MWCNT).

Figure 8:
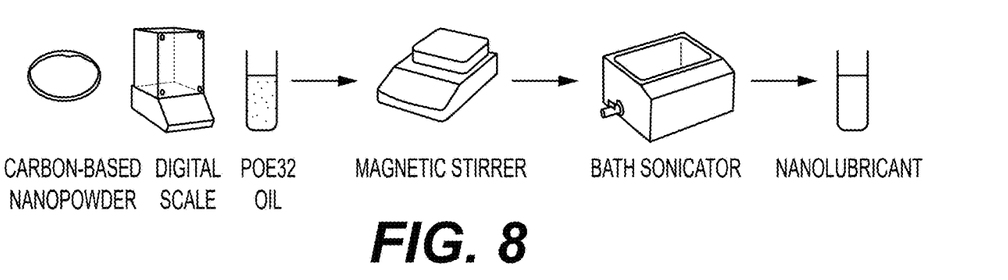
FIG. 8 is an illustration of the process of producing improved nano-lubricants.
Figure 9:
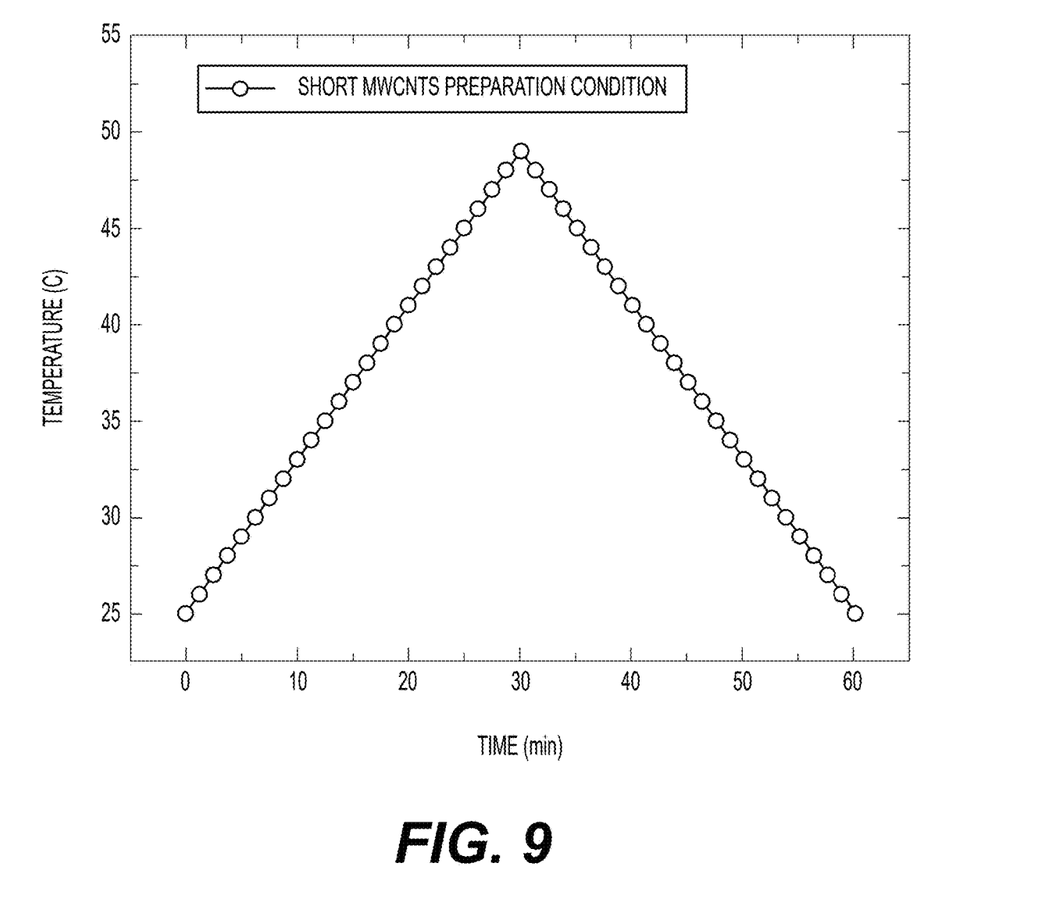
FIG. 9 is a graph showing the reaction conditions for preparing short-MWCNTs, with the sonicator bath temperature starting at 25° C., increasing to 49° C., and then creasing to 25° C. at a rate of 1° C. changer per 1.25 minutes.
Figure 10:
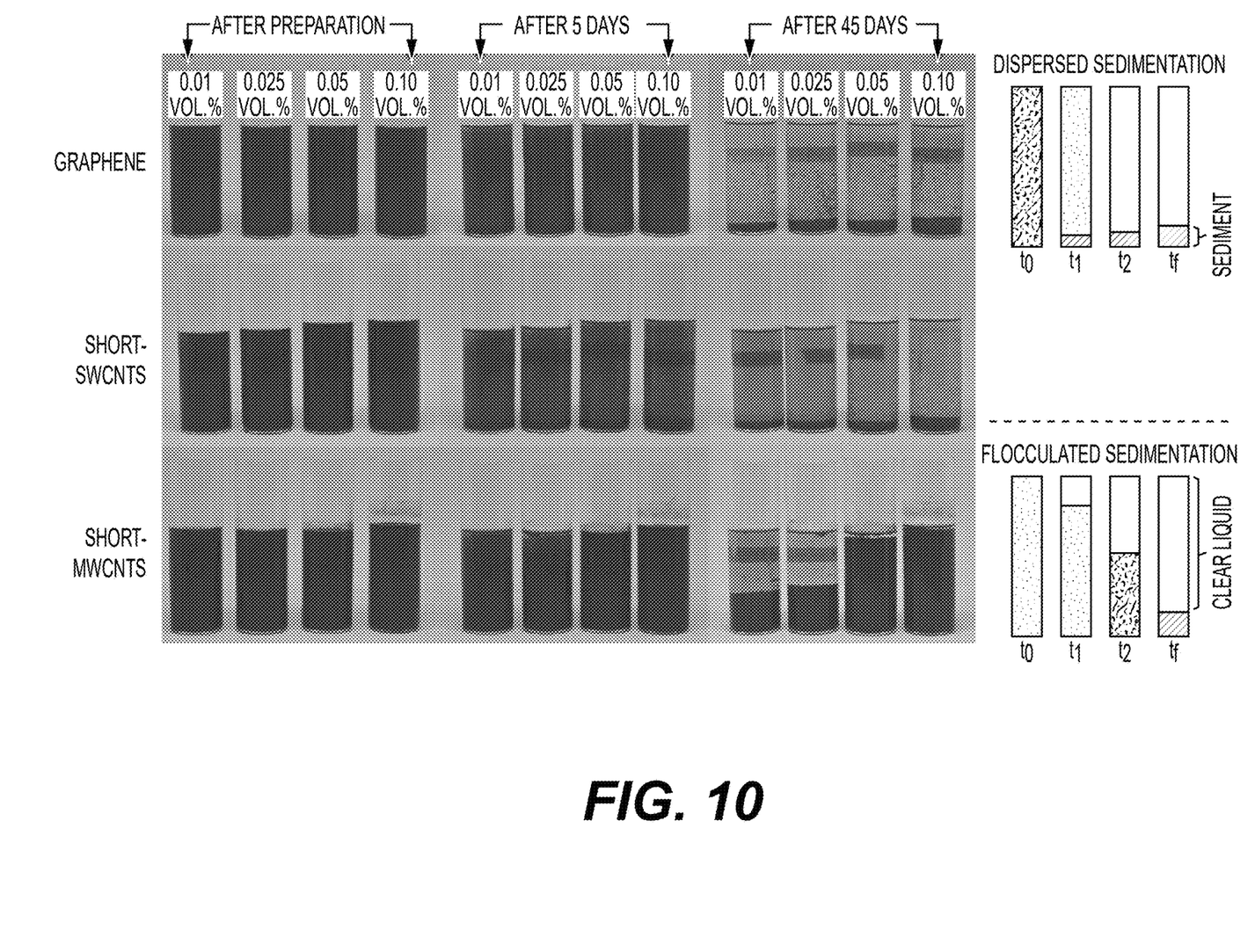
FIG. 10 depicts the results observed immediately after preparation, 5 days after preparation, and 45 days after preparation of graphene, short-SWCNTs, and short-MWCNTs nanolubricants with different nanoparticle concentrations.

Field emission scanning electron microscopy (FE-SEM) and energy dispersive X-ray spectroscopy (EDS) analysis of the powders was conducted, and the results are depicted in FIGS. 7A-7I. Next, 0.01 vol. % of the powders were dispersed in POE oil at room temperature. For GN and SWCNTs suspensions, this was done by mixing the mixtures using a magnetic stirrer for 5 min then intensively dispersing the mixture for about 60 minutes using a bath ultrasonicator (M250 Soniclean, MIDMARK®), at a controlled temperature of about 25° C. (See FIG. 8). For the MWCNTs, the mixture was initially magnetically stirred for 5 min then sonicated for 60 min, while varying the water bath temperature. (See FIG. 9) The water bath temperature of the sonicator was then increased at a rate of about 1° C. per 1.25 min until it reached about 49° C., after which it was decreased at the same rate until it returned to about 25° C. Following the preparation stage, all as-prepared samples were evaluated in terms of their formed sedimentation mechanism. The evaluation was performed using the image capturing approach, for 45 days. The obtained results illustrated in FIG. 10 confirm that we are able to alter the sedimentation settling behavior of the suspension from the dispersed sedimentation to the flocculated sedimentation by altering the sonication temperature, increasing the number of GN sheets, and rolling them together into MWCNTs, as indicated in the long-term stability inspection after 45 days. These findings suggest that the methods disclosure herein offer a more efficient utilization of carbon-based nano-lubricants in current and future real-life applications.

The present methods would help in determining the suitable allocation of the solar light in solar thermal applications. For example, reflected from the sun to the bottom of the suspension (flocculated sedimentation) or to the top of the suspension (dispersed sedimentation).

It is to be understood that the methods of altering sedimentation mechanisms in carbon-based nano-lubricants are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of altering the sedimentation mechanism of a carbon-based nanolubricant, the method comprising:
    adding carbon nanoparticles to a base fluid to obtain a mixture;
    mixing the mixture for about 5 minutes using a magnetic stirrer to obtain a suspension; and
    dispersing the suspension using a bath ultrasonicator for about 60 minutes to obtain the nanolubricant, wherein the bath ultrasonicator comprises a water bath at a temperature of about 25° C.;
    wherein the carbon nanoparticles are selected from the group consisting of graphene (GN), single-walled carbon nanotubes (SWCNTs), and multi-walled carbon nanotubes (MWCNTs).

2. The method of claim 1, wherein the base fluid comprises a poly olester oil.

3. The method of claim 1, wherein the carbon nanoparticles comprise graphene.

4. The method of claim 3, wherein the carbon nanoparticles comprise graphene sheets having a length of about 0.5-2 μm, a width of about 2-7 μm, and a thickness of about 2-6 nm.

5. The method of claim 1, wherein the carbon nanoparticles comprise SWCNTs.

6. The method of claim 5, wherein the SWCNTs have a length of about 0.5-2 μm and a diameter of about 1-2 nm.

7. The method of claim 1, wherein the carbon nanoparticles comprise MWCNTs.

8. The method of claim 7, wherein the MWCNTs have a length of about 0.5-2 μm and a diameter of about 30-50 nm.

9. The method of claim 7, further comprising:
    varying the bath ultrasonicator water bath temperature by first increasing the temperature at a rate of about 1° C. per 1.25 min until the water bath temperature reaches about 49° C., then decreasing the water bath temperature at rate of about 1° C. per 1.25 min until the water bath temperature reaches about 25° C.

10. The method of claim 9, wherein the resulting nanolubricant demonstrates flocculated sedimentation.

11. The method of claim 1, comprising adding 0.01 vol. % of the carbon nanoparticles to the base fluid.

12. A method of altering the sedimentation mechanism of a carbon-based nanolubricant, the method comprising:
    adding multi-walled carbon nanotubes (MWCNTs) to a poly olester oil to obtain a mixture;
    mixing the mixture for about 5 minutes using a magnetic stirrer to obtain a suspension; and
    dispersing the suspension using a bath ultrasonicator for about 60 minutes to obtain the nanolubricant, wherein the bath ultrasonicator comprises a water bath starting at a temperature of about 25° C.; and
    varying the bath ultrasonicator water bath temperature by first increasing the temperature at a rate of about 1° C. per 1.25 min until the water bath temperature reaches about 49° C., then decreasing the water bath temperature at rate of about 1° C. per 1.25 min until the water bath temperature reaches about 25° C.

13. The method of claim 12, wherein the resulting nanolubricant demonstrates flocculated sedimentation.

14. The method of claim 12, wherein the resulting nanolubricant has an increased lifespan.

15. The method of claim 12, comprising adding 0.01 vol. % of the carbon nanoparticles to the base fluid.

16. The method of claim 12, wherein the MWCNTs have a length of about 0.5-2 μm and a diameter of about 30-50 nm.

* * * * *